June 17, 1941.  J. W. WHITE  2,245,740
BRAKE
Filed Nov. 9, 1939

INVENTOR.
JOHN W. WHITE
BY
ATTORNEY.

Patented June 17, 1941

2,245,740

UNITED STATES PATENT OFFICE 2,245,740

BRAKE

John W. White, South Bend, Ind., assignor to Bendix Aviation Corporation, South Bend, Ind., a corporation of Delaware Application November 9, 1939, Serial No. 303,511

3 Claims. (Cl. 188—79.5)

This invention relates to brakes, and is illustrated as embodied in an internal expanding brake for an automobile wheel.

An object of the invention is to simplify the adjustment of a brake of this type, by providing between the shoes a connecting link which can be reversed or otherwise shifted to engage between the shoes parts of different effective lengths.

Figure 1:
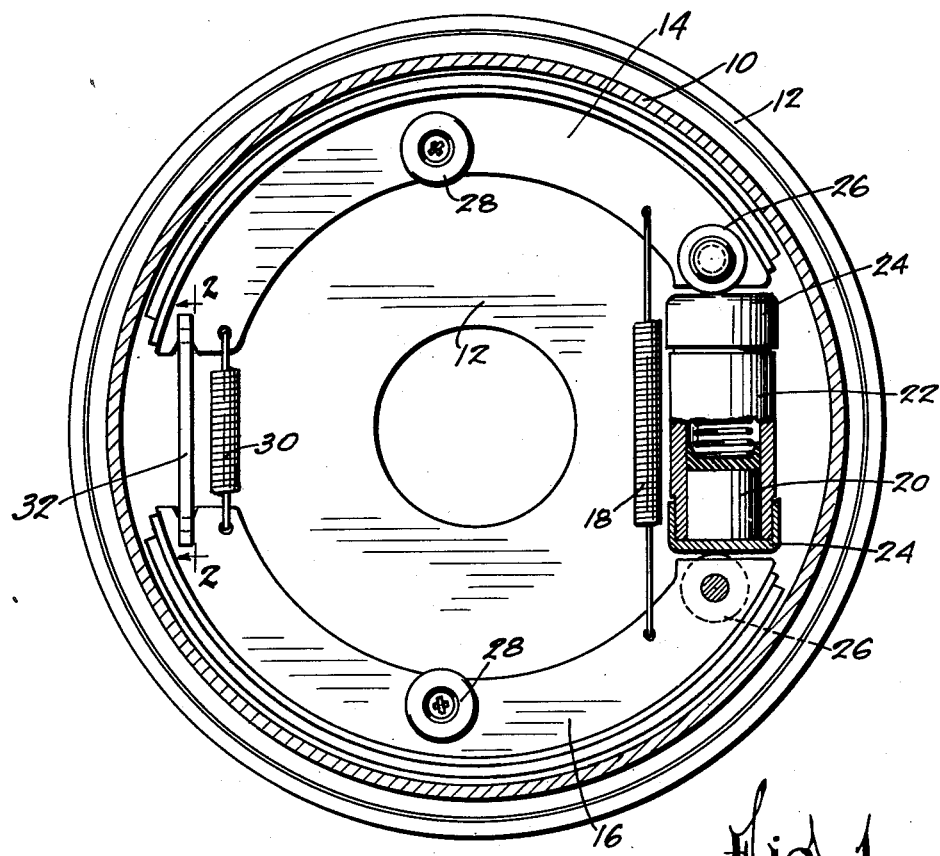
Figure 2:
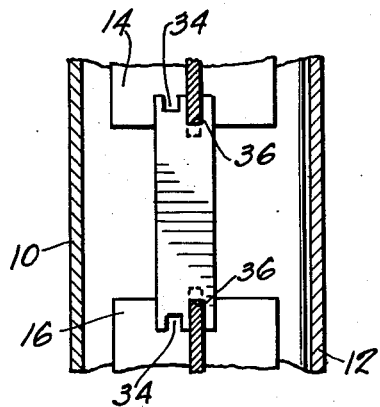

The above and other objects and features of the invention will be apparent from the following description of the illustrative embodiment shown in the accompanying drawing, in which:

Figure 1 is a section through the brake in a plane just inside the head of the brake drum; and Figure 2 is a partial section on the line 2—2 of Figure 1.

The illustrated brake includes a rotatable drum 10, at the open side of which is a support such as a backing plate 12. Within the drum are a pair of brake shoes 14 and 16, adapted to be forced outwardly against the resistance of a return spring 18 by means such as pistons 20 in a wheel cylinder 22 secured to the backing plate.

Caps 24 on the ends of the cylinder serve as anchorages engaged by rollers 26 on the shoe ends, one shoe or the other anchoring according to the direction of drum rotation. Suitable steady rests 28 may be used if needed.

The shoes are held by a tensioned spring 30 against the ends of a rigid connecting link 32. This link is formed with pairs of alined notches 34 and 36, of different depths, forming parts of different effective lengths adapted to be engaged with notches in the ends of the webs of the shoes.

Thus by merely reversing the link about its center line, or by shifting it bodily, the shoes can be engaged with notches 36 when the shoes have new linings or alternatively with shallower notches 34 after the linings have worn.

While one illustrative embodiment has been described in detail, it is not my intention to limit the scope of the invention to that particular embodiment, or otherwise than by the terms of the appended claims.

I claim:

1. A brake comprising shoes connected by a thrust link having in its ends notches of different depths alined in pairs to form parts of different effective lengths, each of said pairs of notches adapted to be engageable alternatively with adjacent ends of the shoes, to provide an adjustment to compensate for wear of the shoes.

2. A brake comprising shoes connected by a thrust link having in its ends parallel notches of different depths alined in pairs to form parts of different effective lengths, each of said pairs of notches adapted to be engageable alternatively with adjacent ends of the shoes, to provide an adjustment to compensate for wear of the shoes.

3. A connecting link for a pair of brake shoes comprising a substantially flat and substantially rectangular member having in its ends a plurality of parallel notches of different depths alined in pairs to form parts of different effective lengths, each of said pairs of notches adapted to be engageable alternatively with adjacent ends of the brake shoes.

JOHN W. WHITE.